(12) United States Patent
Gulledge et al.

(10) Patent No.: US 12,032,594 B2
(45) Date of Patent: Jul. 9, 2024

(54) SYSTEMS AND METHODS FOR USE IN REPLICATING DATA

(71) Applicant: MASTERCARD INTERNATIONAL INCORPORATED, Purchase, NY (US)

(72) Inventors: Heather Gulledge, Wentzville, MO (US); David Gevargizian, Kansas City, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 15 days.

(21) Appl. No.: 17/891,569

(22) Filed: Aug. 19, 2022

(65) Prior Publication Data

US 2024/0061863 A1    Feb. 22, 2024

(51) Int. Cl.
*G06F 17/00* (2019.01)
*G06F 16/25* (2019.01)
*G06F 16/27* (2019.01)

(52) U.S. Cl.
CPC .......... *G06F 16/273* (2019.01); *G06F 16/258* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 6,256,634 B1 * | 7/2001 | Moshaiov | ............... | G06F 16/27 |
| 11,630,838 B1 * | 4/2023 | Gujral | ................ | G06F 16/9024 |
| | | | | 707/625 |
| 11,681,677 B2 * | 6/2023 | Danilov | ................ | G06F 16/182 |
| | | | | 707/610 |
| 2002/0049776 A1 * | 4/2002 | Aronoff | ................... | G06F 16/27 |
| 2009/0077085 A1 * | 3/2009 | Olivieri | ............... | G06F 16/2393 |
| | | | | 707/999.009 |
| 2012/0101990 A1 * | 4/2012 | Holenstein | ........... | G06Q 10/087 |
| | | | | 707/615 |
| 2012/0150829 A1 * | 6/2012 | Bourbonnais | ......... | G06F 16/273 |
| | | | | 707/703 |
| 2012/0246116 A1 * | 9/2012 | Yang | ..................... | G06F 16/275 |
| | | | | 707/634 |
| 2015/0199415 A1 * | 7/2015 | Bourbonnais | ........... | G06F 16/27 |
| | | | | 707/615 |

(Continued)

*Primary Examiner* — Hung D Le
(74) *Attorney, Agent, or Firm* — Harness, Dickey & Pierce, P.L.C.

(57) ABSTRACT

Systems and methods are provided for replicating data between different services used to update databases. One example system includes a database and a computing device coupled in communication with the database, wherein the computing device is configured to perform a create, update or delete operation on the data included in the database and to post an entry representative of the operation to an outbox data structure. The computing device is also configured to retrieve the entry from the outbox data structure; publish the entry as a first message to a message bus, thereby informing a different data system of the operation in the database; receive a second message from the message bus indicative of a create, update or delete operation at a database included in a different data system; and direct a service of the system to perform the create, update or delete operation of the second message.

20 Claims, 3 Drawing Sheets

(56) References Cited

U.S. PATENT DOCUMENTS

| | | | | |
|---|---|---|---|---|
| 2015/0324406 A1* | 11/2015 | Brewer | .................. | G06F 16/248 |
| | | | | 707/722 |
| 2016/0026703 A1* | 1/2016 | Yadav | .................... | G06F 16/13 |
| | | | | 707/613 |
| 2016/0283335 A1* | 9/2016 | Yao | ......................... | G06F 16/27 |
| 2017/0344618 A1* | 11/2017 | Horowitz | ................ | G06F 16/27 |
| 2018/0004828 A1* | 1/2018 | Kathuria | ................. | G06F 16/27 |
| 2018/0004829 A1* | 1/2018 | Kathuria | ............. | G06F 16/2379 |
| 2018/0013714 A1* | 1/2018 | Leach | ...................... | G06F 16/22 |
| 2019/0026352 A1* | 1/2019 | Marathe | ................ | G06F 16/907 |
| 2019/0147097 A1* | 5/2019 | Kumar | ................ | G06F 9/30047 |
| | | | | 707/610 |
| 2019/0294519 A1* | 9/2019 | Garg | .................. | G06F 11/3034 |
| 2019/0332582 A1* | 10/2019 | Kumar | .................. | G06F 16/254 |
| 2019/0361913 A1* | 11/2019 | Yoon | .................... | G06F 16/1858 |
| 2019/0362015 A1* | 11/2019 | Sankar | .................. | G06F 16/278 |
| 2020/0110831 A1* | 4/2020 | Sure | ........................ | G06F 16/13 |
| 2020/0177476 A1* | 6/2020 | Agarwal | ................ | G06F 16/27 |
| 2021/0271577 A1* | 9/2021 | Patil | ..................... | G06F 11/1662 |
| 2022/0300530 A1* | 9/2022 | Beier | .................... | G06F 16/284 |
| 2023/0086547 A1* | 3/2023 | Hickey | ............... | G06F 11/1451 |
| | | | | 707/610 |
| 2023/0169090 A1* | 6/2023 | Gernhardt | ........... | G06F 11/2048 |
| | | | | 707/610 |
| 2023/0177066 A1* | 6/2023 | Pal | ..................... | G06F 16/2358 |
| | | | | 707/610 |
| 2023/0229564 A1* | 7/2023 | Charfauros | ......... | G06F 11/2094 |
| | | | | 707/758 |
| 2023/0289328 A1* | 9/2023 | Boshev | ................ | G06F 16/275 |
| | | | | 707/611 |
| 2023/0367742 A1* | 11/2023 | Beeler | .................. | G06F 16/119 |
| 2023/0401229 A1* | 12/2023 | Gernhardt | ............. | G06F 16/256 |

* cited by examiner

SYSTEMS AND METHODS FOR USE IN REPLICATING DATA

FIELD

The present disclosure is generally directed to systems and methods for use in replicating messages to services that update databases, and in particular, to systems and methods for replicating data (e.g., messages, etc.) to multiple databases in different regions, through replication services in the regions.

BACKGROUND

This section provides background information related to the present disclosure, which is not necessarily prior art.

Data is known to be stored in a database. Access is often provided to the database whereby programs, users, etc., may access and use the data included therein. In certain environments, data is copied between different databases for one or more purposes. For example, the data may be copied from one database in one region to another database in another regions so that the data is then available in both regions. In connection therewith, data may also be modified in the databases, which may require modification of the other database(s) to which the data is copied to ensure exact copies of the data to synchronize the data in the multiple different databases.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Availability of data in databases is often important to operations dependent on that data, whereby the availability of the data is a factor in performance of the operations. The availability of data is limited, in some instances, by replication between multiple different databases. The replication of data, in turn, may be hindered by add-on services for the replication, difficulty in management of the replication and failure scenarios and down-time associated with the replication.

Uniquely, the systems and methods herein provide an integrated replication of data (e.g., via distributed data replication, etc.) between different databases that provides for improved availability of the data at and/or through (or via) the different databases. In particular, a region system includes a database and associated persistence service and replication service. The persistence service interacts with an application or other data-associated service, which requests an alteration to a database associated with the persistence service. The persistence service records the alteration to the database and posts the alteration to an outbox data structure. A replication service, in turn, posts the alteration to a message bus, to be read by replication services associated with other databases (e.g., in other regions, etc.). Similarly, the replication service listens to the message bus for alterations made to other database(s) to be made to the associated database, receives the message(s) and implements the alteration(s) therein. In this manner, the persistence service and replication service(s) cooperate to replicate data in/from (or even to) the particular database, and enable replication of the data to other databases, whereby efficiency, reliability, speed and flexibility over prior data storage architectures is achieved without sacrificing redundant storage.

Figure 1:
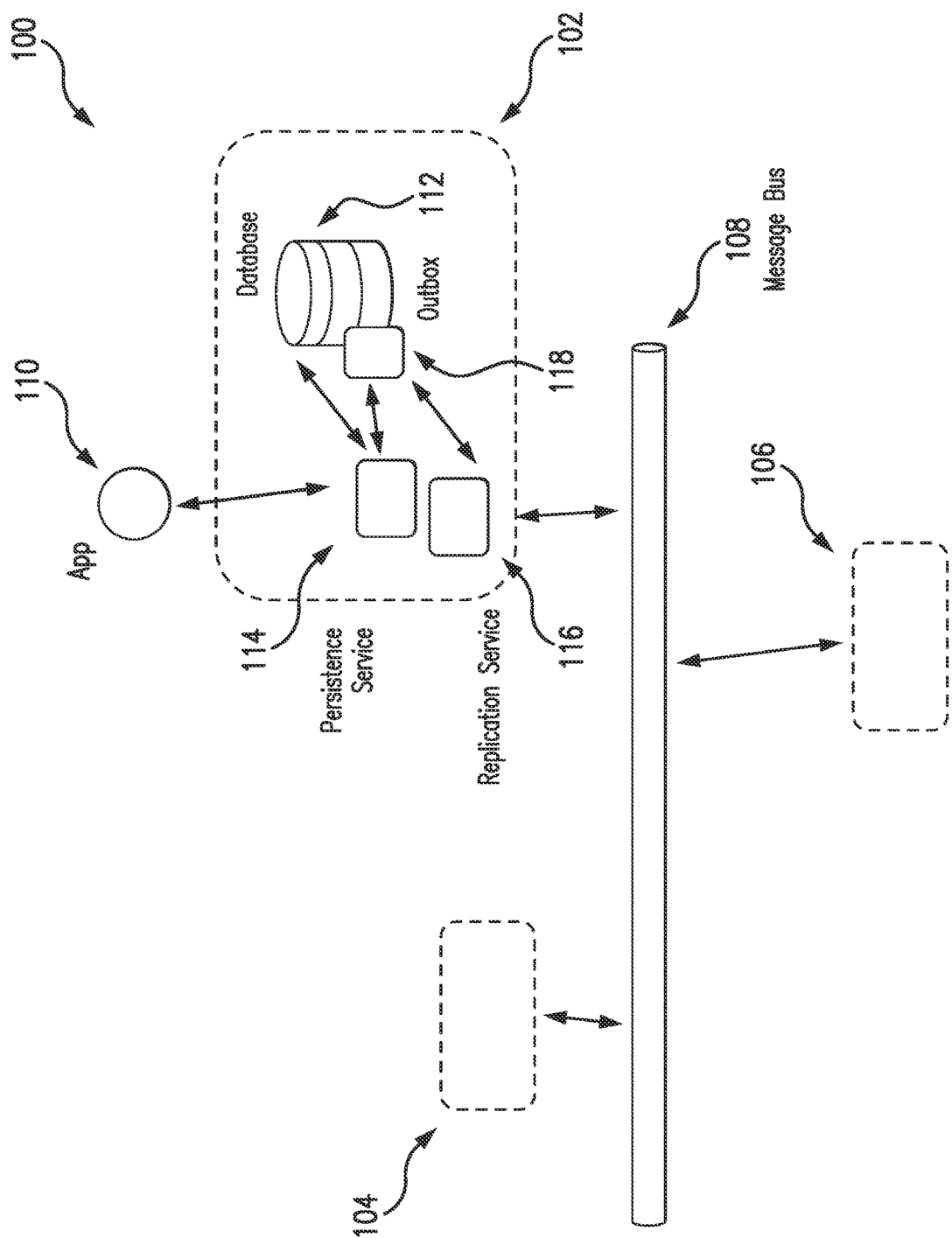
FIG. 1 is an example system of the present disclosure suitable for providing replication of data (e.g., distributed replication of data, etc.) stored in multiple databases, through a message bus architecture.

FIG. 1 illustrates an example system 100, in which one or more aspects of the present disclosure may be implemented. Although the system 100 is presented in one arrangement, other embodiments may include the parts of the system 100 (or other parts) arranged otherwise depending on, for example, a manner of storing data in databases, a distribution of data among different regions/databases, security requirements associated with databases, etc.

The illustrated system 100 includes three data systems 102, 104, and 106. In general, the data systems 102-106 will be physically separated, but may be in the same room, building, facility, region (e.g., postal code, city, state, territory, country, etc.), etc., or in different buildings, facilities, regions, etc. In this example embodiment, the data systems 102-106 are each provided to manage data, whereby multiple applications, services, users, etc., may access data within the given data systems 102-106. The data may include any type of data, which is of interest to one or more programs, applications, services, users, etc. In this example, the data includes transaction data associated with a payment network, such as, for example, Mastercard®, etc., which is representative of multiple transactions or processing of transactions or operations related to the transactions (e.g., amounts, account numbers, identifiers, scores, etc.), etc. Other data may include, without limitation, user profile data, identity data indicative of user identities, etc.

The data systems 102-106 are each coupled in communication with a message bus 108. The message bus 108 may be configured to receives messages and carry the messages between the data systems 102-106. In this example embodiment, the message bus 108 is configured consistent with an event-driven architecture, with a message queueing protocol (e.g., Advanced Message Queuing Protocol (AMQP), Peer-to-Peer (P2P) messaging protocol, etc.), etc. As such, messages are published to a topic, and persisted on the message bus 108 for an interval (e.g., hours, days, weeks, etc.), or until consumed by subscribers on the topic, whereby the message(s) is/are delivered by the message bus 108 based on subscriptions to the topics until the message(s) is/are received by the subscriber(s).

In addition, the data system 102, for example, is associated with multiple applications (including application 110), each of which is configured to interact with the data system 102 to create, update and/or delete data from a database 112 included in the data system 102. The applications (e.g., application 110, etc.) may include any applications (e.g., any application needing replicated data, etc.) including, for example, banking applications, identity applications, security applications, or authentication applications, etc., associated with various services. The applications may be published by a variety of different providers, and utilized by a variety of different clients to interact with the data system 102, etc., for a variety of purposes. It should be understood that the references herein to the application 110 (or other applications) may be a reference to a microservice making up the application 110, whereby, for example, the microservice is configured to communicate with the data system 102 illustrated in FIG. 1, as described in more detail below. It should also be appreciated that the data systems 104, 106 may be similarly configured to the data system 102, to communicate with, for example, multiple applications, etc.

The application 110 (and/or other applications) may be configured to communicate with the data system 102, for example, via multiple different communication protocols, including, for example, TCP/IP, User Datagram Protocol (UDP), and/or Hypertext Transfer Protocol (HTTP), etc. In this particular embodiment, the application 110 is configured to request data operations, via application programming interface (API) calls through use of HTTP. What more, the data system 102 and the application 110 may be configured to rely on mutual transport layer security (MTLS) (e.g., which uses asymmetric cryptographic keys to ensure both the security and integrity of communications, etc.) to secure the communication therebetween. It should be further understood that the application 110 may be an approved or known computing device to the data system 102, whereby communication may be limited to approved and/or known computing devices to limit communication to the data system 102, for example. Other applications of the data system 102 as well as applications of the data systems 104, 106 may be similarly configured, such that the description herein of the application 110 may also apply to the other applications.

As shown in FIG. 1, the data system 102 is illustrated in additional detail, whereby the data system 102 includes the database 112, a persistence service 114, a replication service 116, and an outbox data structure 118 (or, generally, an outbox 118).

In this example embodiment, the database 112 may include any type of database, such as, for example, an ORACLE database etc., in which data relevant to the application 110 (or other applications) is stored. The persistence service 114 is configured to interact with the database 112. More specifically, the persistence service 114 is configured to receive an alteration instruction from the application 110 (or another application), and to perform the alteration to the database 112. For example, the application 110 may instruct, via an API call, a creation of data (or add data) in the database 112, whereby the persistence service 114 is configured to create the specific data, as instructed, in the database 112. In addition, the persistence service 114 is further configured to capture the type of alteration to be performed to the database 112 (e.g., creation of data (or add data), update of data, deletion of data, etc.) and the data that is to be added, altered, or acted upon (e.g., so that the data can be sent to the services in other locations to perform the same action against the remote database instance, etc.). The persistence service 114 is also configured then to write an entry for the alteration, addition, etc. to the data to the outbox data structure 118.

It should be understood that the outbox data structure 118 may be part of the database 112, as generally illustrated in FIG. 1, or it may be separate therefrom. Entries to the outbox data structure 118 may include, for example, a topic name, a database name, a schema name and a content. In connection therewith, the topic name, the schema name, and the content of each of the entries may be determined by application developer(s) associated therewith, for example, using and/or taking into account the replication strategy described herein.

In addition, as shown in FIG. 1, the data system 102 includes the replication service 116, which is configured to poll the outbox data structure 118 for inserts from the persistence service 114 and to publish replication messages to the message bus 108 with a specific topic related to replication. The messages may each include a notation as to the origin of the alteration to the database 112, to indicate to other replication services to pick up the message, but not the replication service 116 which publishes the message. Also, the replication service 116 is subscribed to the topic, whereby the replication service 116 is configured to pick up messages on the topic (which the replication service 116 did not publish), to validate the signatures on the messages, and to pass the alteration indicated in the messages to the persistence service 114. The persistence service 114 is configured to then impose the alteration on the database 112.

It should be appreciated, again, that the data systems 104 and 106 include the same architecture, whereby the description of data system 102 is equally applicable to the data systems 104 and 106. In this manner, the data systems 102-106 are configured to cooperate, via the message bus 108, to maintain replicas of the data structure(s) 118 in each of the data systems 102-106, thereby providing extended access to the database 112 for the application(s) 110 in each of the data systems 102-106.

Figure 2:
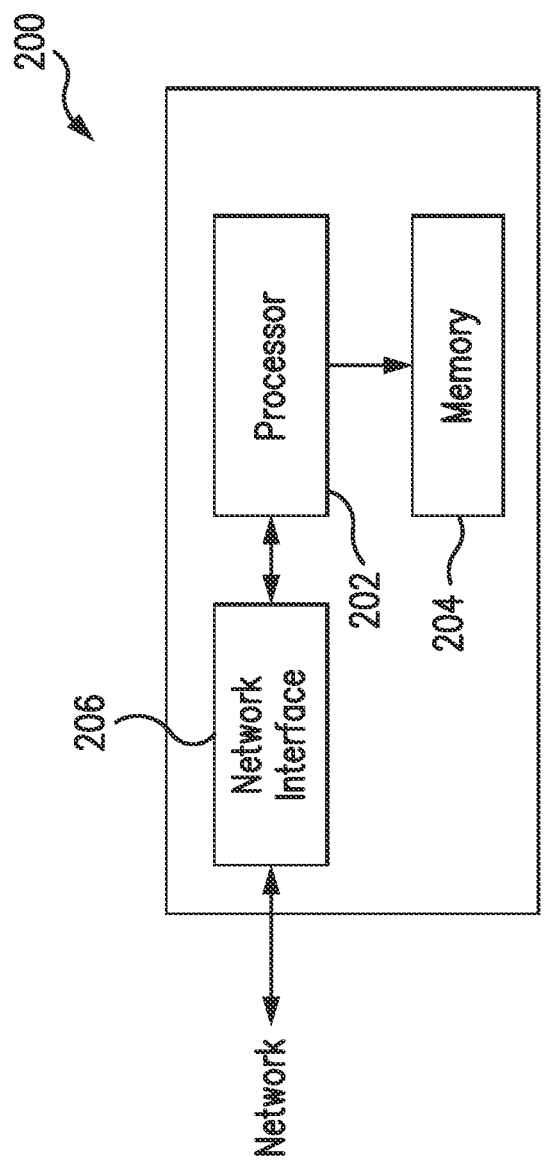
FIG. 2 is a block diagram of an example computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, the database 112, the persistence service 114, the replication service 116, and the output data structure 118 of each of the data systems 102-16 is and/or includes one or more computing devices, either together or separately, which include and/or are generally consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, primary data, messages, entries, annotations, topics, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 that is performing one or more of the various operations herein, whereby such performance may transform the computing device 200 into a special purpose computing device. It should be appreciated that the memory 204 may include a variety of different memories, each implemented in one or more of the operations or processes described herein.

The illustrated computing device 200 also includes a network interface 206 coupled to (and in communication with) the processor 202 and the memory 204. The network interface 206 may include, without limitation, a wired network adapter, a wireless network adapter, a mobile network adapter, or other device capable of communicating to one or more different ones of the networks, and/or with other devices described herein. In some example embodiments, the computing device 200 may include the processor 202 and one or more network interfaces incorporated into or with the processor 202.

Figure 3:
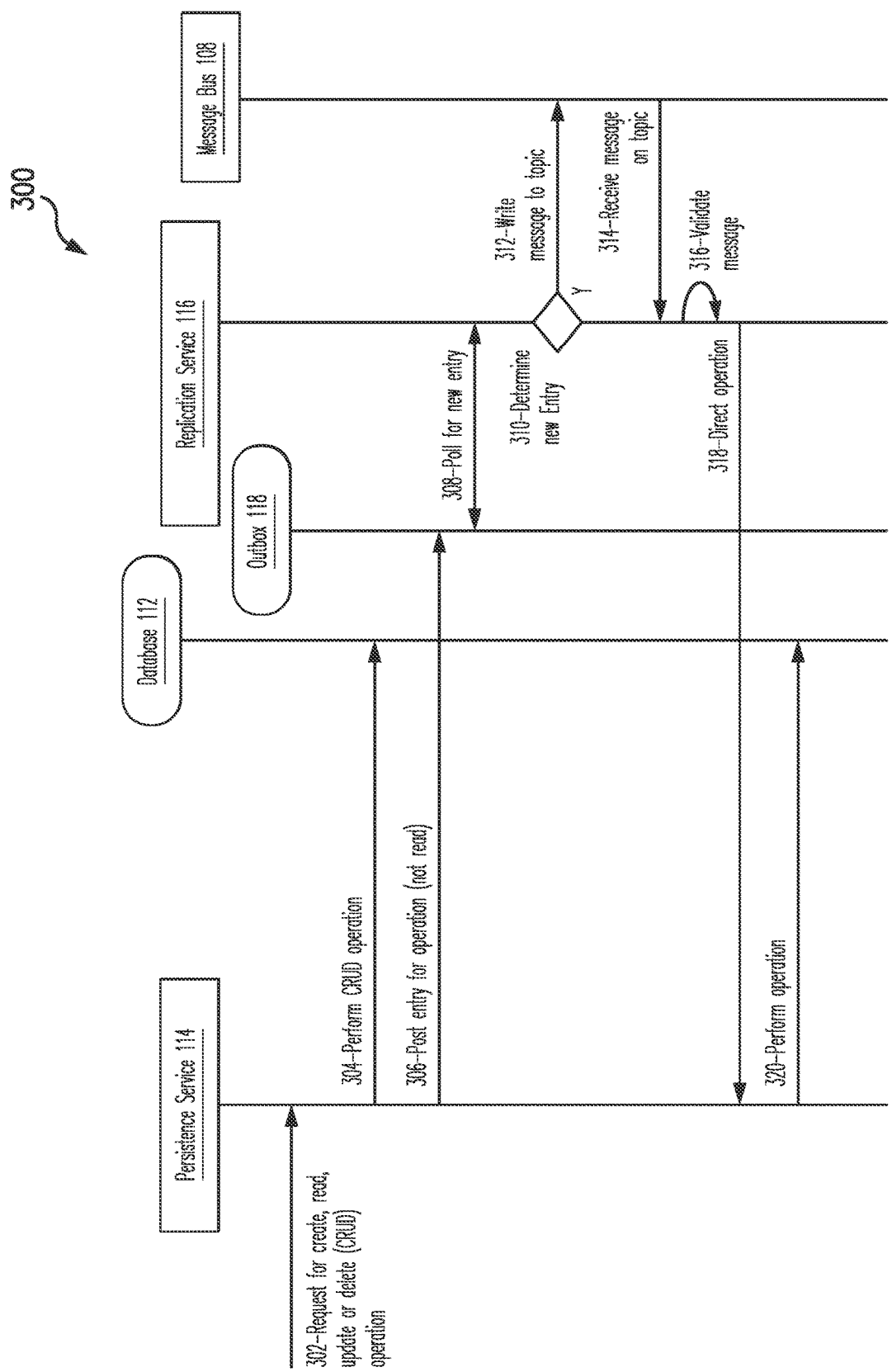
FIG. 3 includes a flow diagram for an example method, which may be implemented in connection with the system of FIG. 1 for providing replication to data (e.g., distributed replication of data, etc.) stored in multiple databases, through a message bus architecture.

FIG. 3 illustrates an example method 300 for use in replicating data to multiple databases (e.g., for providing distributed replication of data, etc.). The example method 300 is described as implemented in the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

Also, the method 300 is described with reference to the data system 102. That said, it should be appreciated that the method 300 may be implemented in the data system 104 or the data system 106 to provide for consistency among the databases included therein.

At the outset, the application 110 requests a create, update or delete operation to data included in the database 112, whereby the request is received, at 302, at the persistence service 114, from the application 110. The request includes a description, identification or designation of the particular data, and the particular operation to be performed. In response, the persistence service 114 performs, at 304, the requested create, update or delete operation on the particular data included in the database 112. For example, the persistence service 114 may delete data from the database 112, or update data from the database 112.

Next, at 306, in this embodiment, the persistence service 114 posts an entry to the outbox data structure 120. In general, because read operations do not need to be replicated to databases in other data systems (or to other databases), the persistence service 114 will only post an entry to the outbox data structure 118, when the operation is create, update or delete (whereby the data in the database 112 is affected), and not when the operation is a read operation. The entry includes a description of the data and the alteration or change to the data. More specifically, for example, the entry may include the data to be changed and the type of change to be made to the data.

The persistence service 114 continues to receive subsequent requests from the application(s) 110, or otherwise, and performs the requested operations for the subsequent request, and also posts entries to the outbox data structure 118, as appropriate.

At 308 (e.g., simultaneously to above or otherwise, etc.), the replication service 116 polls (continuously or intermittently) the outbox data structure 118 for entries from the persistence service 114. When a new entry is determined, at 310, the replication service 116 writes or publishes the changes to the data in the database 112, as a message to the message bus 108, at 312. As an example, the message may include (or may be) JSON (JavaScript Object Notation) data in string format. The JSON data, then, may be received (or may come) from the object in which the application stores the change data. In connection therewith, JSON is supported by many languages that may provide mechanisms to convert an object to JSON (and from JSON back to an object).

In particular, the replication service 116 signs an event or a message with a private key specific to the replication service 116 and then directs the signed event/message to the message bus 108 to a particular topic associated with database replication, to which the replication service 116 and replication services in the other data systems 104 and 106 are subscribed. Also, the replication service 116 identifies the data system 102, generally, or the replication service 116, specifically, in a transaction header of the message/event as the originator of the message (e.g., as a unique identifier, etc.). As such, the data system 104 and 106 are permitted to implement the change in the database therein to maintain consistency between the database 112 of the data system 102 and the databases of the data systems 104, 106, while the replication service 116 ignores the message (as its originator).

Conversely, when the replication service from the data system 104, for example, publishes a similar message to the message bus 108, the replication service 116 receives or reads, at 314, the message from the message bus 108, based on the topic included in the message, which the replication service 116 is subscribed. In general, the message is identified to a different data system (e.g., data system 104, etc.), whereby the replication service 116 determines the message is to be processed (and not ignored). In some implementations, then, the replication service 116 validates the message, at 316, by, for example, validating a signature on the message (e.g., via a public key of a private-public key pair, etc.), and directs, at 318, the operation described in the message to the persistence service 114. For instance, the replication service from the data system 104 (or other sender associated with the message) may sign the message in connection with publishing it to the message bus 108 (e.g., via a hash based message authentication code (HMAC) digital signature, etc.), and the replication service 116 (e.g., in receiving the message, etc.) may then validate the signature of the message as described (e.g., at 316, etc.).

Upon receipt, at 320, the persistence service 114 performs the operation on the data included in the data structure 118, thereby replicating changes to the database(s) in other data systems (e.g., the data systems 104 and 106, etc.) to the database 112 of the data system 102.

In view of the above, the systems and methods herein may permit the replication of data (e.g., distributed data replication, etc.) between different services used to update different databases (in different data systems), through use of an outbox data structure and a message bus between the different databases. The replication in this manner provides a highly available active data system, while also providing scalability by addition of data systems consistent with a particular implementation. In addition, in some example embodiments the replication may be local or remote, and/or may be independent of data store technology (e.g., database/datastore agnostic, etc.), and/or may be self-recovering (e.g., in instances of failure, etc.), etc. Moreover, the manner in which requests for create, update and/or delete (CRUD) operations are received may enhance security of the databases included therein, especially through implementation of mutual transport layer security (MTLS) or other security, and also encryption of messages and/or limiting the permissive computing device communicating with the persistence services. For instance, in various embodiments herein, the systems and methods may be used to replicate security certificate authority information between regions to ensure high availability and disaster recovery. Further, the systems and methods herein may require little, if any, code modification to implement such replication operations (or such replication platform) because they/it uses annotations, and because they/it provides users with control over what and when data is replicated. In Java programming, an example of such an annotation may included:

```
@Replication
ReturnType functionName( ) {
    call persistence service ...
}
```

The systems and methods herein may also provide for secure, real-time (or near real-time) replication of data along with resiliency characteristics for implementing an accessible software system. For instance, in some embodiments, the systems and methods herein may be based on a microservice architecture that allows for multiple communication protocols (e.g., TCP/IP, User Datagram Protocol (UDP), Hypertext Transfer Protocol (HTTP), Representative State Transfer (REST), etc.). Solutions, then, may be implemented at an application layer and may utilize a persistence service pattern, whereby database direct interactions are done via a microservice (e.g., a persistence service, etc.). In connection therewith, the microservice then handles the CRUD functions/operations for the application (or application layer). When the microservice desires to save/store data to a database, it then invokes an API on the persistence service and sends the data to the persistence service API (as an endpoint). At about the same time (or prior or later), a replication function (e.g., implemented as an annotation, for instance, to embellish an existing function; etc.) captures the data/information being saved to (or deleted from) the database along with the API endpoint used and compiles the same into a particular table (or data structure) in the database, for example, an outbox.

In connection with the above, a replication service is further implemented herein. The replication service is configured to replay the same database transaction sent to the persistence service in every replicated region/location. In doing so, the replication service is constantly, continuously, etc. polling the outbox table for any new database changes. In various implementations, only database API calls that both modify the database data and have the annotation are replicated. As such, in these implementations, if an annotation is placed on a function that only reads the database, it will be ignored. From the above, then, it should be appreciated that the replication service may preform (at the least) the following functions (or may be configured, at the least, as follows): (a) read records from the outbox table that need to be copied to other regions and place (publish) that information on a message bus to those other regions; and (b) read (subscribe to) incoming replication messages from the message bus and send them to the local persistence service. In connection with the later, the message bus may be configured to implement publish/subscribe capabilities and may support the Advanced Message Queuing Protocol to distribute the transaction to be replicated to the other regions. The message bus implementation may then use a persistence message queue to help ensure the message will be eventually delivered even if that region is down. In this way, even if processing in a region is halted for maintenance or some other reason, once processing resumes the replication messages will be delivered and the database will be synchronized with its peers. In addition, and as generally described, the replication service reads (subscribes to) the messages on the bus that came from other regions, formats that information into transaction, and sends it to the local copy of the persistence service.

Further, the replication service may mark the transaction header with the origin of the original database change. The replication service may then use the header to determine if a message needs to be replicated in a specific region or not. This may limit replication to appropriate messages, and inhibit endless replication. The result is that a call to change, update, or delete information via the persistence service in one region happens in every other region as well. If a region is temporarily unavailable the data is persisted on the message bus, and the database will be updated with everything it has missed once the region is active again. Therefore, a highly available active/active/active system is achieved without the need for vendor specific products and lock-in.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) performing a create, update or delete operation on the data included in the database of a data system; (b) posting an entry representative of the create, update or delete operation to an outbox data structure of the data system; and (c) retrieving the entry from the outbox data structure; (d) publishing the entry from the outbox data structure as a first message to a message bus, thereby informing a second data system of the create, update or delete operation in the database of the data system; (e) receiving a second message from the message bus, the second message indicative of a create, update or delete operation at a database included in a different data system; (f) directing a persistence service of the data system to perform the create, update or delete operation of the second message on the database; (g) receiving a request for the create, update or delete operation on the data included in the database of the data system, via an application programming interface (API) call from an application associated with the data; and (h) validating the second message, prior to directing the persistence service to perform the create, update or delete operation of the second message.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A data system for use in replicating data between different services used to update multiple databases, the data system comprising:
    a first database including data;
    a computing device coupled in communication with the first database and a message bus, wherein the computing device includes a memory having first executable instructions defining a persistence service and second executable instructions defining a replication service; and
    wherein the computing device is configured, by the first executable instructions, to:
        perform a first create, update or delete operation on the data included in the first database; and
        post an entry representative of the first create, update or delete operation to an outbox data structure; and
    wherein the computing device is configured, by the second executable instructions, to:
        retrieve the entry from the outbox data structure;
        publish the entry from the outbox data structure as a first message to the message bus, thereby informing a different data system of the first create, update or delete operation in the first database;
        receive a second message from the message bus, the second message indicative of a second create, update or delete operation at a second database included in the different data system, the second database different than the first database; and
        direct the persistence service to perform the second create, update or delete operation of the second message on the first database.

2. The system of claim 1, wherein the computing device is further configured, by the first executable instructions, to receive a request for the first create, update or delete operation on the data included in the first database, via an application programming interface (API) call from an application associated with the data.

3. The system of claim 2, wherein the outbox data structure is included in the first database.

4. The system of claim 3, wherein the entry includes an identifier specific with the persistence service.

5. The system of claim 1, wherein the computing device is configured, by the second executable instructions, to validate the second message, prior to directing the persistence service to perform the second create, update or delete operation of the second message on the first database.

6. The system of claim 5, wherein the computing device is configured, by the first executable instructions, to publish the entry to a first topic name on the message bus; and
    wherein the computing device is configured, by the second executable instructions, to receive the second message based on subscription to a second topic name of the second message.

7. The system of claim 1, wherein the computing device is further configured, by the first executable instructions, to perform the second create, update or delete operation of the second message on the first database.

8. A non-transitory computer-readable storage medium including executable instructions, which when executed by at least one processor of a first data system in replicating data between different services used to update multiple databases, cause the at least one processor to:
- perform a first create, update or delete operation on data included in a first database of the first data system;
- post an entry representative of the first create, update or delete operation to an outbox data structure of the first data system;
- retrieve the entry from the outbox data structure;
- publish the entry from the outbox data structure as a first message to a message bus coupled in communication with the at least one processor, thereby informing a second data system of the first create, update or delete operation in the first database of the first data system;
- receive a second message from the message bus, the second message indicative of a second create, update or delete operation at a second database included in the second data system; and
- direct a persistence service of the first data system to perform the second create, update or delete operation of the second message on the first database of the first data system.

9. The non-transitory computer-readable storage medium of claim 8, wherein the executable instructions, when executed by the at least one processor, further cause the at least one processor to receive a request for the first create, update or delete operation on the data included in the first database of the first data system, via an application programming interface (API) call from an application associated with the data.

10. The non-transitory computer-readable storage medium of claim 9, wherein the outbox data structure is included in the first database.

11. The non-transitory computer-readable storage medium of claim 10, wherein the entry includes an identifier specific with the persistence service.

12. The non-transitory computer-readable storage medium of claim 8, wherein the executable instructions, when executed by the at least one processor, further cause the at least one processor to validate the second message, prior to directing the persistence service to perform the second create, update or delete operation of the second message on the first database.

13. The non-transitory computer-readable storage medium of claim 8, wherein the executable instructions, when executed by the at least one processor, further cause the at least one processor to:
- publish the entry to a first topic name on the message bus; and
- receive the second message based on subscription to a second topic name of the second message.

14. The non-transitory computer-readable storage medium of claim 8, wherein the executable instructions, when executed by the at least one processor, further cause the at least one processor to perform the second create, update or delete operation of the second message on the first database.

15. A computer-implemented method for replicating data between different services used to update multiple databases, the method comprising:
- performing, by a computing device of a data system, a first create, update or delete operation on data included in a first database of the data system;
- posting, by the computing device, an entry representative of the first create, update or delete operation to an outbox data structure of the data system;
- retrieving, by the computing device, the entry from the outbox data structure;
- publishing, by the computing device, the entry from the outbox data structure as a first message to a message bus coupled in communication with a different data system, thereby informing the different data system of the first create, update or delete operation in the first database of the first data system;
- receiving, by the computing device, a second message from the message bus, the second message indicative of a second create, update or delete operation at a second database included in the different data system; and
- directing a persistence service of the first data system to perform the second create, update or delete operation of the second message on the first database of the data system.

16. The computer-implemented method of claim 15, further comprising receiving a request for the first create, update or delete operation on the data included in the first database of the data system, via an application programming interface (API) call from an application associated with the data.

17. The computer-implemented method of claim 16, wherein the outbox data structure is included in the first database; and
- wherein the entry includes an identifier specific with the persistence service.

18. The computer-implemented method of claim 15, further comprising validating the second message, prior to directing the persistence service to perform the second create, update or delete operation of the second message.

19. The computer-implemented method of claim 15, further comprising:
- publishing the entry to a first topic name on the message bus; and
- receiving the second message based on subscription to a second topic name of the second message.

20. The computer-implemented method of claim 15, further comprising performing the second create, update or delete operation of the second message on the first database.

* * * * *